United States Patent Office 3,700,498
Patented Oct. 24, 1972

3,700,498
PROCESS FOR MAKING ELECTROPHOTO-
GRAPHIC PLATES
Kay Keiji Kanazawa, Hajime Seki, and George Bryan Street, San Jose, Calif., assignors to International Business Machines Corporation, Armonk, N.Y.
No Drawing. Filed Dec. 10, 1970, Ser. No. 97,052
Int. Cl. B44d 1/34, 1/42; C23c 11/00
U.S. Cl. 117—230     4 Claims

ABSTRACT OF THE DISCLOSURE

Electrophotographic plates are formed by depositing a layer of beta phase polycrystalline $As_4S_4$ by evaporation under vacuum onto an electrically conductive substrate held at a temperature between 100° C. and 200° C.

FIELD OF THE INVENTION

The present invention deals with a process for preparing electrophotographic plates. In particular, it deals with a process for preparing an electrophotographic plate having as its photoconductive element a layer of beta phase polycrystalline $As_4S_4$.

PRIOR ART

U.S. Pat. 3,121,006 lists $As_2S_2$ as a photoconductive insulating compound suitable for use in an organic binder as part of an electrophotographic plate.

The photoconductive properties of realgar ($As_4S_4$) are disclosed in Phys. Stat. Sol., 18, 601 (1966).

Czechoslovakian Patent 119,873 (Chemical Abstracts, vol. 67, page 3538, entry 37593e) discloses the use of a realgar layer as part of a photoconductor.

U.S. Pat. 3,423,237 discloses an arsenic disulfide layer as part of a photoconductive target for a vidicon camera tube.

The process of the present invention, however, is readily distinguished from all such prior art in that none of it deals with a process for depositing a film of beta phase polycrystalline $As_4S_4$.

SUMMARY OF THE INVENTION

According to the present invention, an electrophotographic plate having superior properties is prepared by depositing a layer of beta phase polycrystalline $As_4S_4$ on an electrically conductive substrate. It is important that during the deposition process the substrate temperature be held between 100° C. and 200° C. The optimum electrophotographic properties are obtained by deposition of the realgar film onto the substrate surface at a temperature of 140° C. The deposition is carried out by evaporation under vacuum. Any suitable conductive substrate may be employed. Aluminum has been found to give outstandingly good results, but any of the various substrates known to the art and stable at the deposition temperature may be used.

The beta phase of $As_4S_4$ is normally stable only at high temperatures. It is an unexpected advantage of the present process, however, that it results in obtaining beta phase $As_4S_4$ which is stable indefinitely at room temperatures. Beta phase polycrystalline $As_4S_4$ has been found to have superior photoconductive properties, and the process of the present invention provides a way for preparing electrophotographic plates which utilize these properties.

When the expression beta phase $As_4S_4$ is used, it is the beta phase material normally stable above 267° C. C. Unfortunately, no uniformity of nomenclature exists and this phase has been sometimes called the alpha phase. For the purposes of the present application, however, it is to be understood that the term beta phase refers to the high temperature stable phase, and not the more common room temperature stable monoclinic phase.

It has been found possible to extend the spectral responses and stability of a beta phase polycrystalline realgar film by depositing over it a compatible panchromatic photo-generative layer on the exposed surface; for example, there may be deposited a layer of selenium, or a layer of selenium/tellurium mixture, or a layer of organic photoconductor, such as the organic photoconductor shown in U.S. Pat. 3,484,237. While the use of such a layer is often desirable, it is an optional and not an essential feature of the present invention.

The following examples are given solely for the purposes of illustration and are not to be construed as limitations on the present invention, many variations of which will occur to those skilled in the art without departing from the skill or the scope thereof.

EXAMPLE

Polycrystalline $As_4S_4$ was synthesized directly from pure arsenic metal (free from oxide) and sulfur by heating the pure elements together under vacuum in a sealed rotating tube. The resulting $As_4S_4$ was purified by vacuum sublimation and by zone refining in an inert atmosphere. Realgar prepared and purified in this manner is the beta phase material normally stable above 267° C. The purified $As_4S_4$ is then evaporated under vacuum from a molybdenum boat held at a temperature of 275° C. to prevent decomposition of the $As_4S_4$ molecule. The vapor was condensed on the aluminum substrate maintained at 140° C. The source to substrate distance was 10 centimeters and the evaporation time was 40 minutes. The resulting films were subtantially polycrystalline $As_4S_4$ in the high temperature beta crystalline phase and were stable indefinitely at room temperature.

Electrophotographic plates prepared according to this process exhibit excellent photographic properties.

What is claimed is:

1. A process for making an electrophotographic plate, said process comprising depositing, by evaporation under vacuum at a temperature on the order of about 275° C. onto an electrically conductive substrate held at a temperature of from 100° C. to 200° C., a layer of beta phase polycrystalline $As_4S_4$.

2. A process as claimed in claim 1 wherein the temperature of the substrate is held at 140° C.

3. A process as claimed in claim 1 wherein the substrate is aluminum.

4. A process as claimed in claim 1 wherein the beta phase polycrystalline $As_4S_4$ is subsequently covered with a layer of a compatible panchromatic photo-generative material.

References Cited

UNITED STATES PATENTS 3,243,293     3/1966     Stockdale _____ 117—200

RALPH S. KENDALL, Primary Examiner

K. P. GLYNN, Assistant Examiner

U.S. Cl. X.R.

96—1.5; 117—34, 106 R, 201